March 24, 1964 P. M. CHRISTENSEN ETAL 3,126,240
PLUG-IN BUS DUCT
Filed Dec. 4, 1956 4 Sheets-Sheet 1
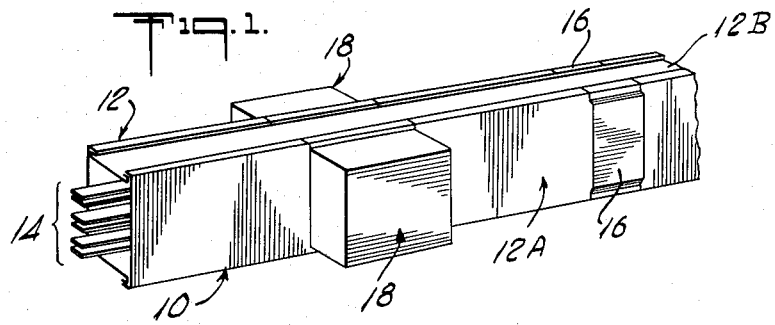
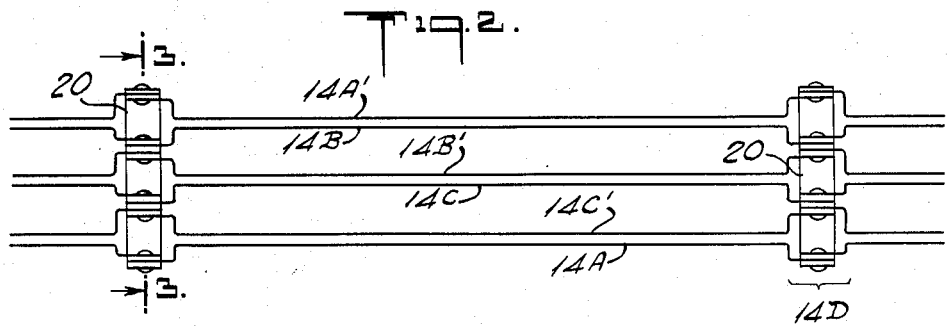
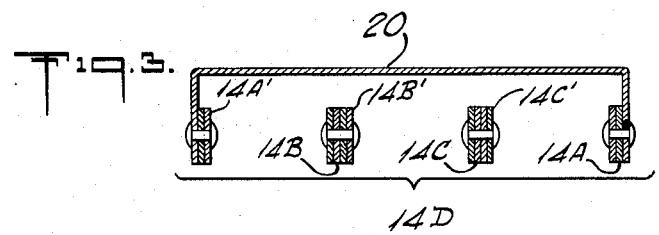
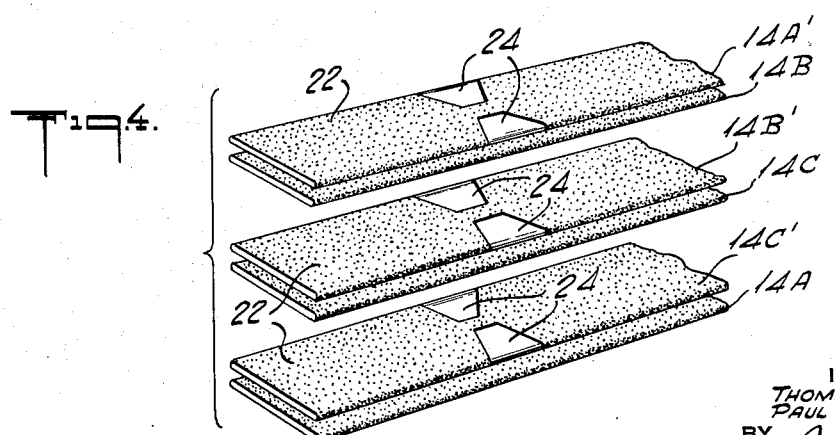
INVENTORS
THOMAS M. COLE
PAUL M. CHRISTENSEN
BY
ATTORNEY

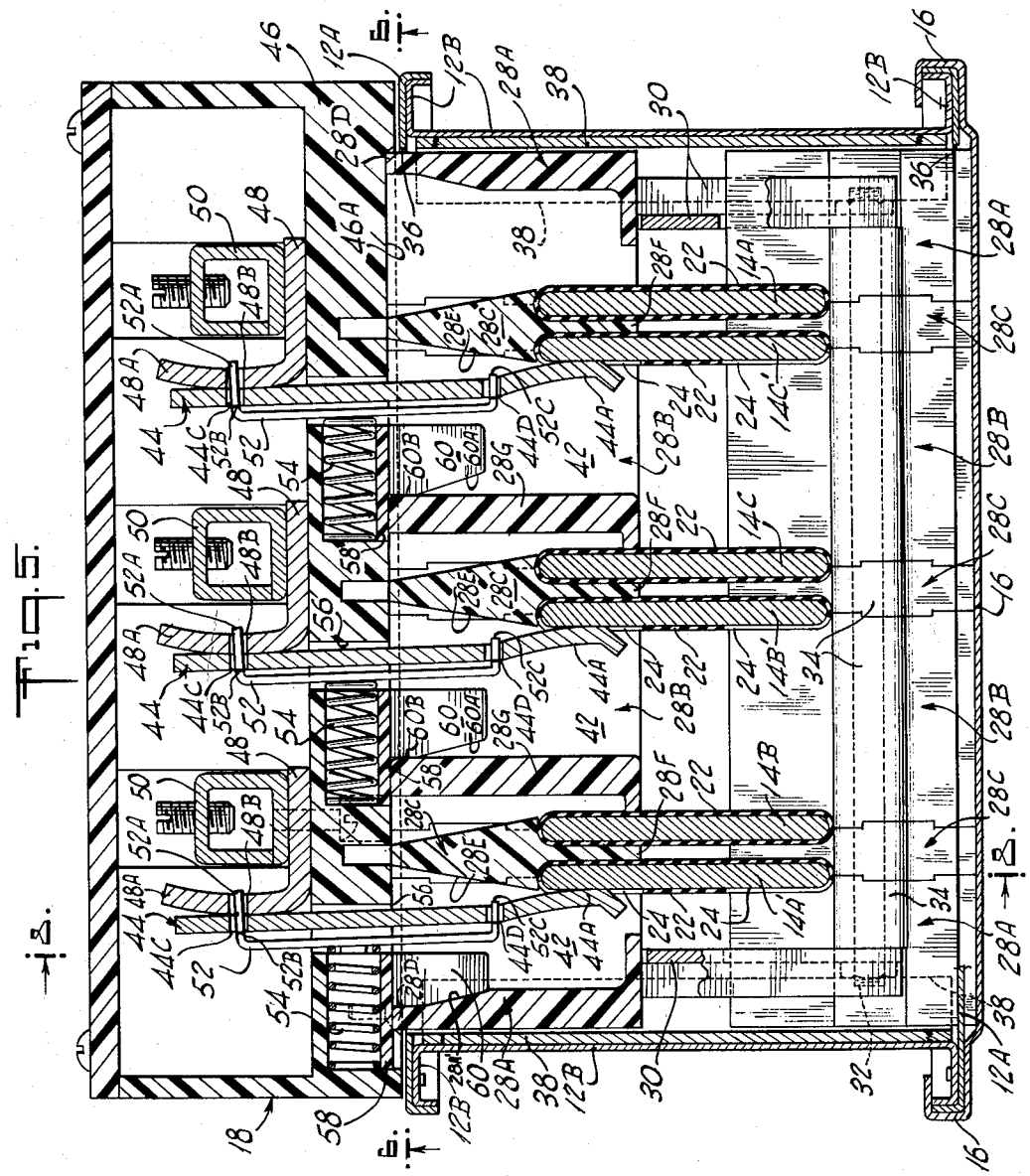

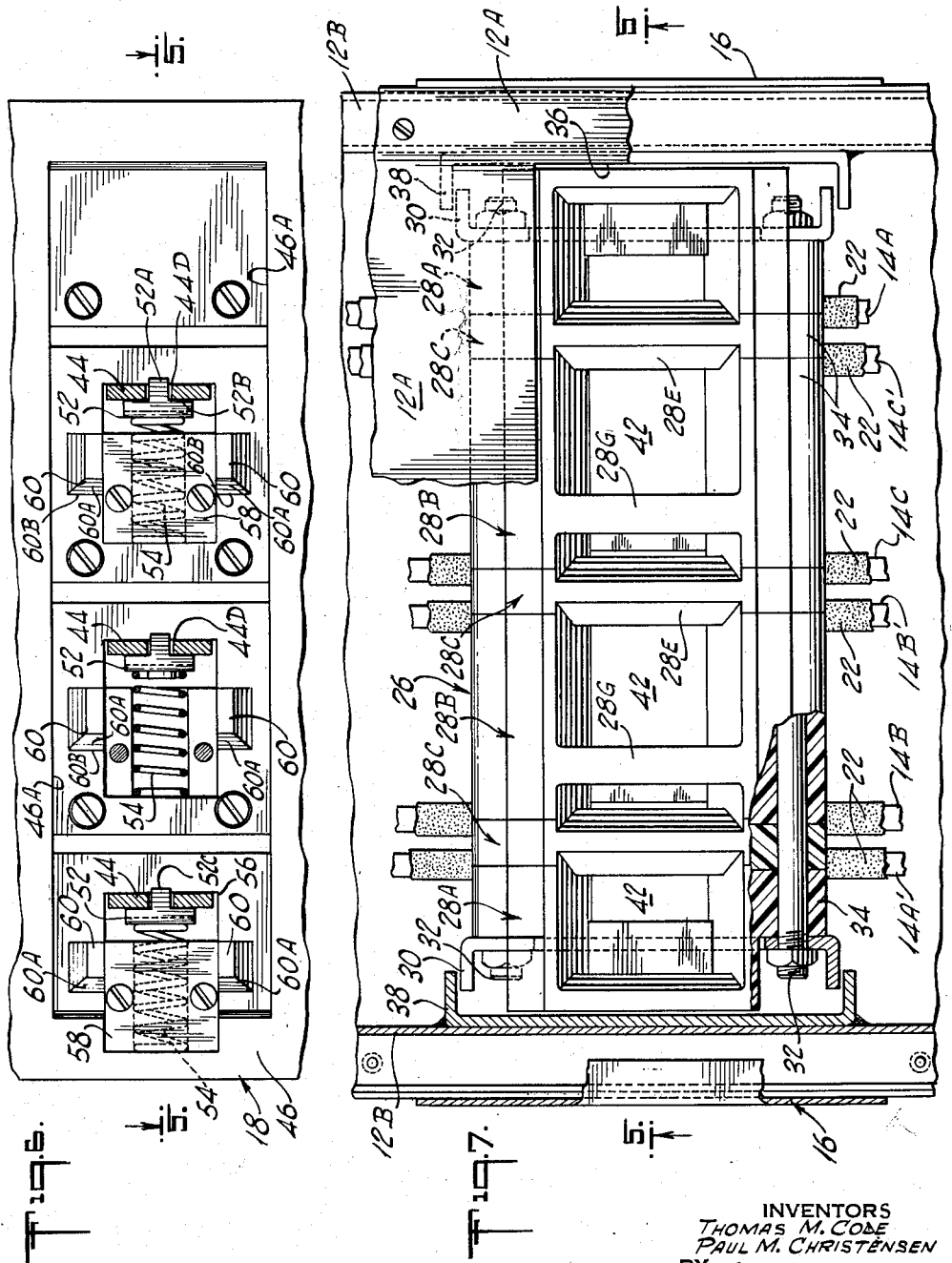

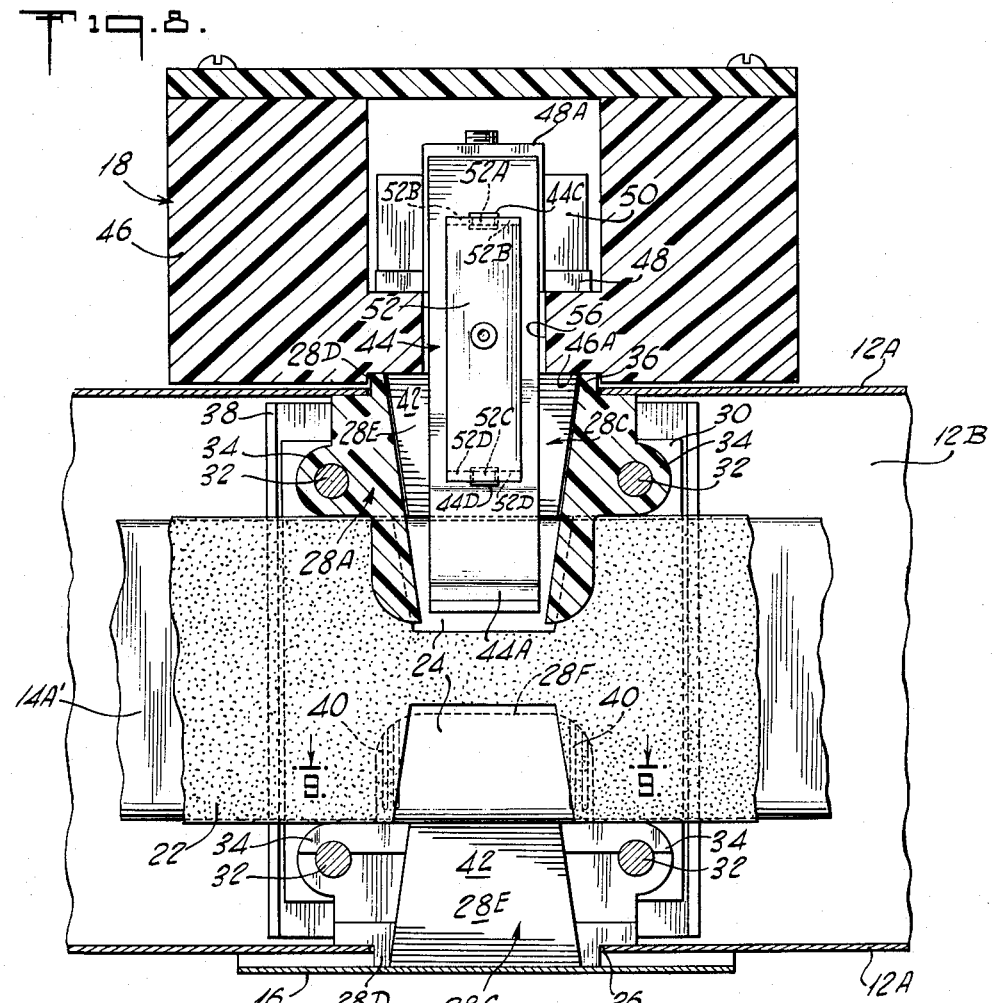
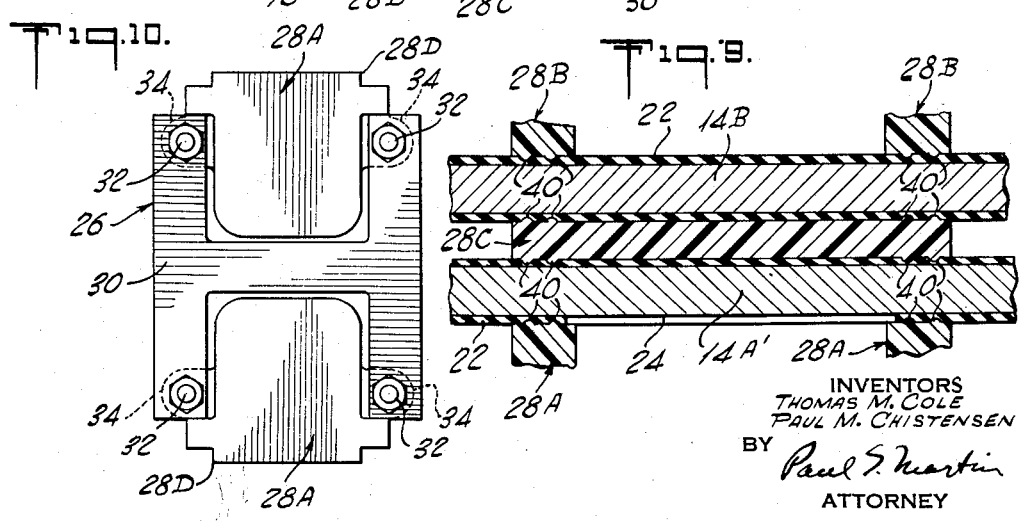

United States Patent Office 3,126,240
Patented Mar. 24, 1964

3,126,240
PLUG-IN BUS DUCT
Paul M. Christensen, West Orange, N.J., and Thomas M. Cole, Harrison, N.Y., assignors to Federal Pacific Electric Company, a corporation of Delaware
Filed Dec. 4, 1956, Ser. No. 626,133
19 Claims. (Cl. 339—22)

The present invention relates to electrical bus duct of the plug-in type, particularly to the paired phase form of plug-in bus duct, and to plug-in devices therefor.

An object of the present invention is to provide a novel form of bus duct of the low reactance type having provision for plug-in devices such, for example, as load tap-offs. A physical characteristic of low reactance bus duct is the close spacing of conductors which operate at different potentials or, in the case of polyphase distribution, where the conductors are of different phases. This close spacing introduces the dual problems of providing adequate insulation between the close-spaced bars and of making plug-in connection to the different poles or the different phases, as the case may be, despite this closeness of spacing. In the preferred embodiment which is described in detail below and where three-phase power is conducted by the bus duct and delivered to plug-in devices, the broad and thin bus bars are arranged side by side with their broad faces opposed; the current of each phase is carried by pairs of conductors connected in parallel, where such parallel-connected conductors are physically spaced relatively far apart; and where the conductors are arranged in pairs with different-phase conductors disposed in close-spaced pairs.

As an important feature of the invention, the contacts of the plug-in device are arranged to make contact with the respective different phase bars without in any way disturbing the important close-spaced relationship. This, it will be recalled, is a basic characteristic on which low reactance depends. The bus bars in the illustrative embodiment are arranged in parallel planes, with alternating narrow and wide spaces. The contacts of the plug-in device (one contact per pair of bars) project into the wide spaces between the close-spaced pairs. Furthermore, the bus bars are covered by insulation, but in the region where the projecting contacts engage the bars, an area on only one of each close-spaced pair of bars is bared. The companion bar being thus completely covered by insulation in that region, no increase in spacing is needed to meet insulation requirements.

The contacts of the plug-in unit provide wiping action as they slide into engagement with the wide faces of the bus bars. Furthermore, even though each of the contacts engages only one surface of its respective bus bar (being in this respect unlike so-called standard plug-in duct where each contact has two blades per bus bar) each wiping contact nevertheless applies firm contact pressure against its respective bus bar.

A further novel feature of the invention found in the illustrative embodiment is the provision of an insulating supporting structure which clamps the bus bars to fix them relative to each other, which insulating structure also provides passages for the plug-in contacts; and the insulating structure additionally operates with the plug-in unit for providing reaction forces to balance the contact pressure that acts transversely on the projecting contacts. The insulating supporting structure is effective to hold the bars in their desired spatial relationship independent of the enclosing duct. The bus bars are covered with insulation, which covering is interrupted in areas in alignment with the passages through the insulating supports of the bus bars.

It has been noted that the bars are spaced close to each other in the low reactance bus assembly. Nonetheless, as will be seen, the illustrative embodiment of the invention provides a minimum space between the close-spaced bars. The pressure of a plug-in contact is in the direction that would normally tend to decrease the spacing between the close-spaced bars. The insulator assembly, herein provided, includes spacers between the close-spaced bars of each pair in the regions opposite the bare areas of the wrapped bus bars, for preventing contact pressure from reducing the space between the close-spaced bars.

Bus duct commonly is employed in horizontal lengths, as along the ceiling of a factory building. In other installations, however, the bus duct is installed vertically as a riser. A novel feature of the insulator assembly provided in the illustrative embodiment of the invention is that the insulator assembly itself firmly and reliably grips the wrapped bus bars, and means is provided for interengagement of the insulator assemblies and the enclosing duct structure for preventing endwise shift of the bus bars within the duct, a consideration that is particularly important in vertical installations of the bus duct as a riser.

A further feature of the invention resides in the provision of novel means for guiding the contacts of a plug-in unit toward the broad faces of the bus bars. In the illustrative embodiment an insulator element abuts the edge of each bus bar and protects the bar against abutting engagement by the plug-in contact during insertion thereof, and, further, the insulator element has a guide surface that merges with the bare contact surface of the bus bar, thus giving a smooth path for plug-in advance of the contact. The insulating element also abuts the edge of the adjacent close-spaced bus bar and protects the insulating covering of that next-adjoining bar from accidental damage by a plug-in contact.

The guide passages formed in the insulator assembly in the illustrative embodiment have surfaces which co-act with slant camming surfaces on projecting elements of the plug-in unit when the latter is first being moved into position; and the slant is such that the contacts of the plug-in unit gradually move transversely as they move forward. This transverse shift of the contacts lifts the contacts from limit stops in the plug-in device to transfer contact pressure to the bus bars. This arrangement has the advantage of developing adequate contact pressure without requiring an inordinate amount of insertion effort.

As a further feature, interengaging surfaces are provided on the plug-in device and in the duct assembly that extend parallel to the contact faces of the bus bars, so that the final portion of the inserting stroke of a plug-in device is substantially parallel to the broad faces of the bus bars. By virtue of this arrangement there is eliminated any tendency of the plug-in device to shift outward, as might otherwise be the case if the slant surfaces were to continue effective during the full insertion stroke.

As noted above, the contacts of the plug-in device are necessarily of such construction as to have resilient contact with the bus bars in the direction perpendicular to the length of the plug-in contacts. As still further features of the invention there are provided a set of resilient contact assemblies adapted to carry heavy currents and of highly reliable and relatively inexpensive construction. As will be seen, each projecting contact of a plug-in device rockably engages a fixed conductor in the plug-in device, at the end of the contact remote from that which is to engage the bus bars. A spring is provided in the plug-in device acting on the plug-in contact at a point between the bus bar contact end thereof and the rockable contact end thereof. This single spring acts both to develop resilient contact pressure of each plug-in contact, and to bias such contact against its fixed conductive supporting and connecting member.

The foregoing novel features and others that will appear from the following detailed description of an illustrative embodiment of the invention will be naturally subject to a latitude of modification and varied application by those skilled in the art. Thus, while the three-pole bus assembly therein shown is well suited for use in the usual three-phase applications it may be used for other distribution systems such as a single-phase 3-wire, two-phase 3-wire, two-phase 4-wire, and four-wire 3-phase arrangements. In the four-wire 3-phase application, the addition of a neutral at any position in the area of bus bars simply involves the addition of a neutral contact in the plug-in unit; and such 4-contact plug-in units can be inserted from either wide face of the bus duct in exactly the same way as the three-pole plug-in devices described below can be inserted from either wide face of the duct.

The illustrative embodiment is shown in the accompanying drawings which form part of the present disclosure. In those drawings:

FIG. 1 is a perspective of a portion of a bus duct to which the present invention is applied.

FIG. 2 is a schematic edgewise view of an assembly of broad flat bus bars, showing the interconnection of a unit-length of the bus bars to a unit-length of duct with portions of the bus bars in adjoining unit-lengths of duct, and FIG. 3 is an enlarged cross-sectional view of a portion of FIG. 2 along the line 3—3 thereof.

FIG. 4 is a fragmentary view of an assembly of bus bars particularly showing areas of the bus bars wrapped with an insulating cover and with areas bared for engagement by plug-in contacts.

FIG. 5 is the cross-sectional view of a bus duct of the type in FIGS. 1 to 4 with a plug-in unit in its operative assembly with the bus duct. This cross-section is taken along the line 5—5 in FIGS. 6 and 7.

FIG. 6 is a fragmentary view of the plug-in unit of FIG. 5, viewed from the side thereof that engages the bus duct.

FIG. 7 is a fragmentary plan view of the bus duct, with the bus duct wall broken away and revealing the bus bar supporting and insulating assembly.

FIG. 8 is a cross-sectional view of the assembly plug-in units and bus duct along the line 8—8 in FIG. 5.

FIG. 9 is a fragmentary cross-sectional view along the line 9—9 in FIG. 8, and

FIG. 10 is an endwise view of the insulator assembly of FIGS. 5, 7 and 8, drawn to smaller scale.

Referring now to the drawings, there appears an illustrative embodiment of the invention which is intended as illustrative and not as limiting.

The assembly of FIG. 1 includes a bus duct generally indicated by the numeral 10 having a duct 12 enclosing an assembly of bus bars 14. The bus bars are shown aligned with each other, with their edges in a pair of parallel planes and with their board faces in successive parallel planes. Six bars are illustrated, with the bars arranged in three groups of two bars in each group. The bars of each group are close to each other and the groups are relatively far apart.

At spaced apart points along the broad walls 12A of the duct, provision is made for receiving plug-in devices for connection of a load or of a branch circuit or for any other suitable purpose. At one such position a cover 16 conceals an opening in wall 12A of the duct, and at another position a plug-in unit 18 is shown, assembled to the duct. A further unit 18 is shown directly opposite the first-mentioned unit, that is, on the broad wall of the duct opposite first-mentioned wall 12A. Units 18 include spring biased contacts which engage the bus bars 14. Units 18 may, optionally, contain suitable controls such as switches, or circuit breakers or fuses or combinations of these (not shown).

The bus duct is made in standard lengths, commonly 10 feet, and at the ends of each unit-length of bus duct there is provision for mechanically joining together multiple lengths of the enclosing duct and of the bus bars. As seen in FIG. 2, the six bars are arranged for three-phase 3-wire transmission of power (although the same connections will be understood to be suitable for single-phase or two-phase 3-wire distribution). Bars 14A and 14A' are seen to be interconnected by a bar 20 (see FIG. 3) and form one pole of the bus system. Bars 14B and 14B' are joined to each other at the ends of the unit-length of bus duct; and similarly bars 14C and 14C' are joined to each other at the ends of the unit length of bus duct. These connections of the bars to each other are formed at each end, and, as seen in FIG. 2, the corresponding bars of the next adjoining unit-lengths of bus ducts are likewise connected to each other and to the whole bars 14 shown in FIG. 2.

It is current standard commercial practice for the bus bars to be of quarter inch thick silvered copper or aluminum and to be 2 inches wide or wider, depending upon current rating. These bars are covered with insulation, commonly wrapped on the bars, but an air space is allowed to remain between the adjoining faces of the bars. As seen in FIG. 4, the bus bars 14A' and 14B are seen close to each other and form the upper group of two bars, these bars having a center-to-center distance of ½ inch. This means that an air space of nearly ¼ inch is formed between the conductive broad faces of the bus bars of a close-spaced group of two bars. Bars 14B' and 14C similarly form a close-spaced group of two bars with ¼ inch face-to-face separation; and similarly 14C' and 14A are ¼ inch apart. Bars 14B and 14B' are separated relatively far apart, 2 inches for example. The arrangement of bars shown, and their interconnection in the manner shown, has been found to be an effective low-inductance arrangement for transmitting three-phase power, and it also has low impedance characteristics in other three-pole applications.

As seen in FIG. 4, the bus bars are wrapped in insulation, to avoid breakdown such as might occur with the relatively small spacing between the conductors. The covering 22 of insulation is seen to be continuous along the length of the conductors or bus bars except for certain areas 24 which are bare. These bare areas are for engagement by plug-in contacts of units 18 and may for convenience be termed "contact areas." Insulation 22 is also discontinuous at the very ends of the bus bars where conductive bolted connections are made to the adjoining lengths of bus bars (FIG. 2). The bare connections have adequate separation through air to avoid voltage break down.

Contact areas 24 are formed in the illustrative embodiment on the bars 14A', 14B' and 14C', that is, on only one bar of each group of two bars. A plug-in unit 18 may accordingly be inserted from either side of the bus duct 10. The projecting contacts of the plug-in unit will engage the corresponding phase bars, regardless of which side of the bus duct is to be used and without inverting the plug-in unit 18. This feature will be more fully appreciated when the detailed nature of the plug-in unit has been described.

An insulating and bar-clamping structure 26 is provided for holding the bars in the desired spatial relationship. This structure is shown in FIGS. 5 and 7 to 10 inclusive. Insulating and clamping structure 26 has an upper row of insulating blocks 28A, 28B, 28C and a duplicate lower row of blocks 28A, 28B, 28C, and at each end of the assembly there is an H-shaped metal member 30. Four rods 32 extend through lateral ears 34 on the blocks 28A, 28B, 28C and they also extend through aligned holes in the extremities of member 30, for uniting the insulator assembly. This assembly is better illustrated in FIG. 7, where it is shown assembled to the bus bars and within the bus duct. The insulator assembly or insulating structure 26 is covered by wall 12A of the duct 12, except for an opening 36 therein. Walls 12A of the duct are screwed or otherwise suitably united to the side walls 12B of the duct; and the end pieces 30 of the insulating assembly 26 are received in a pair of channels 38 which are welded or suitably joined to the side walls 12B of the duct. The blocks forming assembly 26 are seen to include a pair of end blocks 28A (which abut the side walls of the duct), a pair of center blocks 28B, and three "spacer" or "filler" blocks 28C. Two blocks 28C are interposed between the respective end blocks 28A and the center blocks 28B which are near blocks 28A; and the third block 28C is interposed between the two center blocks 28B. As seen in FIG. 9, the blocks 28A, 28B, 28C grip bus bars 14C' and 14A; and by virtue of ribs 40 formed on each of the insulating blocks and which press into the insulating covering 22 on the bus bars, these insulating blocks prevent relative movement of the bus bars along the duct. (It will be recalled that the insulating assembly 26 is prevented from endwise shifting as a unit within the duct because of the interlocking fit of members 30 and 38.) This construction is of particular importance where the bus duct is disposed vertically, as a riser in a building for example. The duct is supported by suitable hangers or other fasteners which fix the duct 12 to the building; and the bus bars within the duct are fixed to prevent endwise movement by the interengagement of members 30 and 38 and by the engagement of ribs 40 of the insulating blocks with the insulation 22 on the bus bars.

A number of insulating assemblies 26 are provided at a series of places spaced along the duct, as for example, every 18 to 24 inches. These insulating assemblies constitute clamping frames which fix the positions of the bus bars in relation to each other without any dependence on the enclosing duct for this purpose. A feature of the present invention is in the utilization of such a bar-supporting structure for the further function of receiving the plug-in devices 18 and for guiding the plug-in devices into effective engagement with the bus bars 14.

As seen in FIGS. 5, 7 and 8, a series of passages 42 are formed in the assembly 26 by the assembly of one of the large blocks 28A or 28B with one of the spacer or filler blocks 28C. These passages admit the projecting contacts 44 of plug-in units 18, so that the bus-engaging portion 44A of each contact can bear against the bare contact areas 24 of the several bus bars. Unit 18 includes an insulating block 46, conveniently a molded unit. Three conductors 48 are fixed to block 46, these fixed conductors having fittings 50 that may form terminals of the plug-in unit 18.

The upper ends 44B of contacts 44 have rocking engagement with a curved portion 48A of the fixed conductors 48. Members 44 and 48 are relatively rigid pieces, advantageously formed of silver-plated copper for high conductivity and low contact resistance.

Member 52 bears against each contact 44 at two points, and applies spring pressure of compression spring 54 against its stab contact 44; and this pressure in turn is applied at the respective stationary contact conductor 48, and at the bus bar engaged by that stab contact 44. Member 52 has the additional purpose of keying the associated stab contact 44 to the associated conductor 48 as well as providing its own positioning retention. Member 52 engaging contact 44 has an integral upper tongue 52A which extends through an opening 44C in contact 44 and through an aligned opening 48B in fixed conductor 48. At each side of tongue 52A, there is a shoulder 52B which bears against the broad face of contact 44. Member 52, advantageously of steel, has a further tongue 52C flanked by shoulders 52D. Tongue 52C extends into hole 44D in contact member 44.

A coil spring 54 is provided for each contact member 44 and bears against member 52 at the place where it extends through the bottom of the insulating block 46, approximately midway along the length of member 52. When the plug-in unit 18 is removed, each spring 54 presses its contact 44 against a stop 56 formed in member 46, stop 56 being one side of the opening in member 46 through which the contact 44 extends. This limits the spring-biased advance of each contact 44, the bias being provided by coil spring 54. Cover plates 58 retain springs 54 in the positions illustrated. (In FIG. 6, the center cover plate has been removed for clarity of illustration.) From FIG. 5 where the plug-in unit is assembled to the bus duct, it is evident that the pressure of spring 54 is applied both at the rocking contact 44B and 48A and at contact portion 44A when it is in engagement with the contact area 24 of the bus bars.

Normally the assembly of each contact member 44 and fixed conductor 48 could be established by having a projection on one fit into a hole on the other. However, the provision of steel member 52 for accomplishing this purpose has special advantage. The pressure of spring 54 is not applied to the middle portion of the relatively long contact member 44 but instead it is transmitted almost directly to the places where each member 44 engages the rocking contact 48A and the contact areas 24 on the bus bars. This is important in the event of heating of the contact 44. In such event there might be a tendency of the hot copper or like conductor to deform or become distorted. Any such tendency is avoided by making indirect application of spring pressure via bridging member 52 to the contact extremities. Member 52 is a relatively poor conductor, but it is of excellent hot strength (considering contact operating temperatures).

A series of projections 60 extend integrally from molded member 46 into the passages 42 in the bus duct. These projections 60 have slant surfaces 60A, which, as will be seen, aid in the insertion of the plug-in unit. Slant surfaces 60A of each member 60 terminate in "straight" portions 60B. These portions 60B are "straight" in the sense that they are parallel to the wide faces of the bus bars. Projections 60B engage corresponding straight portions of the insulator blocks 28A and 28B. In FIG. 5, the upper left-hand block 28A has a slant surface 28A', which amounts merely as a relief, to allow full insertion of the projection 60 without unnecessarily reducing the wall thickness of block 28A.

When the plug-in units are being inserted, slant surfaces 60A engage and slide over the upper suitably rounded corners of walls 28G of two blocks 28B, and the corresponding corner of the left-hand block 28A in FIG. 5. During this insertion stroke, contacts 44 engage slant guide surfaces 28E. This causes contacts 44 to deflect toward projections 60 during the insertion of the plug-in device, and to increase the initial compression of springs 54. As contacts 44 leave surfaces 28E, they slide across contact areas 24 of the bus bars. This wiping contact is a highly desirable type of engagement that is utilized in the low impedance plug-in bus duct of the present invention. In the fully inserted position, members 60 serve to provide a reaction force in the direction perpendicular to the wide faces of the bars so that the projecting contacts 44 can apply heavy contact pressure against contact areas 24. There is no resulting tendency of the plug-in unit 18 to shift out of the fully inserted position illustrated. This reaction force is provided by engagement of projections 60B with the several insulating blocks 28A and 28B. While a pair of projections 60 are illustrated as being associated with each of the projecting contacts 44, a smaller number of projections may be found satisfactory.

In the fully inserted position of the unit 18, as seen in FIGS. 5 and 8, the insulating blocks have a portion 28D which extends out through opening 36 in the duct wall 12A; and this projection of the insulating blocks 28 is received in recess 46A of the molded block 46.

As noted above, the various projecting contacts 44 are guided toward the bus bar contact areas 24 by slant surfaces 28E formed on the spacers 28C. These surfaces 28E are aligned with and merge with the contact areas 24. By virtue of the arrangement of members 28C abutting the edges of the close-spaced pairs of bus bars, there is no possibility of the bus bars acting as an obstruction, which would make contact insertion difficult; and there is also no possibility of a contact 44 damaging the insulation that is wrapped about the bus bars.

In the fully inserted position of the plug-in units, illustrated in FIG. 5, the pressure of the contacts against the bus bars cannot displace the bus bars because of the clamping assembly 26. It is of course clear that the spacers 28C, which have portions 28F between the close-spaced bus bars, prevent these bars from being shifted closer to each other. However, as will be clear from the lower portion of FIG. 5, the blocks 28A and 28B also fill the spaces between the groups of bars that are widely separated from each other. Thus, the insertion of the plug-in unit cannot shift the bus bars relative to each other, despite the high contact pressures of the multiple contacts. Also, there is no tendency of the plugging-in operation to shift the bus assembly laterally, because the force of the contacts 44 against the bus bars, acting in one direction, is balanced by the reaction force of the projections 60 against the insulator assembly 26.

As seen from FIGS. 5 and 7 in particular, the center blocks 28B have partitions 28G which render the entire assembly 26 asymmetrical. This forestalls any attempt to insert the plug-in unit backwards, that is, with the contact portions 44A facing in the opposite direction. If backward insertion were attempted, projecting contacts 44 would engage the right-hand walls of spacers 28C. With this engagement, the end portions of several projections 60 would abut the tops of walls 28G of insulating blocks 28B. Alternatively, if two contacts 44 were slid across the faces of two walls 28G, projections 60 of the third contact 44 would abut block 28A at the right as viewed in FIG. 5. It is therefore impossible for a reversed plug-in unit to be inserted far enough for the projecting contacts to reach any of the bus bars.

An exemplary illustrative embodiment of the invention has been described above but it is evident that modifications and varied application of the novel features may readily be made by those skilled in the art. Consequently it is appropriate that this invention should be broadly construed in accordance with its full spirit and scope.

What is claimed is:

1. In combination a bus duct and a plug-in device therefor, said bus duct including an insulating structure and a plurality of relatively broad and thin bus bars supported thereby, said bus bars having their broad faces disposed in successive spaced parallel planes, said insulating structure embodying a passage for a projecting contact of said plug-in device, said passage being formed in part by a guide surface of insulation aligned with the broad face of one of said bus bars and an opposite wall portion, a plug-in contact laterally movably mounted and projecting from said plug-in device via said passage to said one bus bar, said projecting contact having means biasing it for movement in the bus bar contacting direction and having a stop in the plug-in unit limiting its end position of movement in said direction and said plug-in device having an electrically inert projection formed with a slant surface cooperating with said opposite wall portion to provide a reaction force balancing the pressure of said contact against said bus bar, said projection and said guide surface being arranged to converge toward the inside of the bus duct, so that, as a plug-in device is being inserted, the co-action of the slant surface of said projection with said opposite wall portion and the coaction of the projecting contact with said guide surface will progressively deflect said resilient contact away from said stop to insure adequate contact pressure of the contact against the bus bar, said inert projection having a portion parallel to the bus bar surface engaged by said contact, said parallel portion cooperating with said opposite wall when the plug-in device is fully inserted for maintaining contact pressure without developing any tendency of the plug-in unit to be pushed out of its fully inserted position.

2. A plug-in device for a bus duct of the type having a series of relatively thin and broad bus bars wherein the broad faces of the bus bars are disposed in successive parallel planes and the edges of the bus bars are disposed in a pair of plane substantially perpendicular to said successive parallel planes, said plug-in device having a series of projecting laterally resilient contacts extending from the device in the direction of insertion into the duct and said contacts being spring-based in the direction perpendicular thereto for establishing lateral pressure engagement against only one broad face of each respective engaged bus bar, each of said contacts having a portion thereof formed for engagement with a bus bar facing in only one direction and each said contact being insulated from all other adjacent contacts of the plug-in unit.

3. A plug-in device for a bus duct of the type having a series of relatively thin and broad bus bars wherein the broad faces of the bus bars are disposed in successive parallel planes and the edges of the bus bars are disposed in a pair of planes substantially perpendicular to said successive parallel planes, said plug-in device having a series of laterally resilient contacts projecting from the device in the direction of insertion into the duct and being spring-biased in the direction perpendicular thereto for establshing lateral pressure engagement with a side face of the engaged bus bar, and said device further having at least one projecting electrically inert element formed with a straight portion near the base thereof to be parallel with the face of a bus bar engaged by the contacts and having a slant cam surface adjoining said straight portion for cooperation with the bus duct to cause deflection of the contacts in the direction of increased bias during initial insertion of the plug-in device into the bus duct and said straight portion providing a reacton force for maintaining contact pressure of said contacts against the bus bars of the bus duct when the plug-in unit is fully inserted without developing a tendency of the plug-in unit to shift away from the bus duct.

4. A plug-in device having projecting contacts including a body portion, a fixed conductor mounted in said body portion, an elongated contact member having one portion in rockable engagement with said fixed conductor and having a contact portion remote from said first-mentioned portion, said contact portion projecting well beyond said body portion to a position of clearance, means including a spring for applying spring bias laterally against said contact member and a stop forming part of said body portion and coacting with said contact member only at a portion thereof spaced substantially from said contact portion for limiting the lateral travel of the contact member.

5. A plug-in device having projecting contacts including a body portion, a fixed conductor mounted in said body portion, an elongated contact member having one portion in rockable engagement with said fixed conductor and having a contact portion remote from said first-mentioned portion said contact portion projecting well beyond said body portion to a position of clearance, means including a spring for applying spring bias laterally against said contact member and a stop forming part of said body portion and coacting with said contact member only at a portion thereof spaced substantially from said contact portion for limiting the lateral travel of the contact member, said device also including an electrically inert projection cooperable with an assembly into which the plug-in device is to be inserted for resisting the lateral force developed when the contact member is in pressure engagement with a circuit element of such assembly.

6. A plug-in device having projecting contacts including a body portion, a fixed conductor mounted in said body portion, an elongated contact member having one portion in rockable engagement with said fixed conductor and having a contact portion remote from said one portion, said contact portion projecting well beyond said body portion to a position of clearance, said fixed conductor and said contact member being of a high electrical conductivity metal, a bridging member of a relatively low conductivity metal of high hot strength extending along said contact member over a major portion of its length and bearing laterally against said contact member near its extremities, and a spring bearing against said bridging member between the ends thereof, said bridging member having a projection extending through apertures in the contact member and in the fixed conductor for fixing the relative assembly thereof and said bridging member further having interlocking engagement with said contact member at a point adjacent said contact portion of said contact member.

7. A plug-in device for cooperation with a plug-in bus duct in which an insulator assembly is provided with a series of passages leading to exposed flat contact areas of a series of bus bars within the plug-in bus duct, said plug-in device including a body portion, a series of projecting contacts having contact portions engageable with the bus bars, spring means effective to bias the projecting contacts laterally for applying contact pressure in the direction transverse to the direction of insertion thereof, and projecting elements extending from said body portion cooperable with the insulator assembly of the plug-in bus duct in which the plug-in device may be inserted for providing a reaction force in the direction opposite to said contact pressure.

8. A unit length of plug-in bus duct including an enclosing rectangular metal duct, a series of relatively broad and thin bus bars having their broad faces in successive parallel planes parallel to an opposed pair of walls of said rectangular metal duct, at least one wall of the remaining walls of said enclosing rectangular metal duct extending across the edges of the bus bars and having openings therein for providing access to said bus bars for a plug-in unit, and insulating supporting means at each opening in the duct having passages therein for admitting projecting contacts of a plug-in unit for contact with an engageable broad face of certain bus bars at each opening, said certain bus bars being separated from each other by others of said series of bus bars, said insulating supporting means having obstructing portions preventing access to said others of said series of bus bars.

9. A bus duct in accordance with claim 8 wherein said insulating supporting means additionally includes obstructing portions preventing access to the broad surfaces of the engageable bus bars opposite the engageable surfaces thereof.

10. A bus duct in accordance with claim 9 wherein said insulating supporting means engages both of the broad faces of said other bus bars and occupies the space between said other bus bars and said obstructed broad faces of said certain bus bars for providing lateral resistance against thrust applied by the contacts of a plug-in unit when in contact with said engageable surfaces.

11. A bus duct in accordance with claim 8 wherein said insulation supporting means includes a series of insulators shaped complementary to portions of said bus bars for maintaining said bus bars in predetermined spaced relationship, and means uniting said insulators in assembly to each other and to said bus bars independent of said rectangular metal duct.

12. A unit length of plug-in bus duct including an enclosing rectangular metal duct, a series of relatively broad and thin bus bars having their broad faces in successive parallel planes, said enclosing rectangular metal duct having at least one wall extending across the edges of the bus bars and having openings therein for providing access for a plug-in unit to said bus bars, and insulating means at each opening in said one wall for supporting said bus bars, said insulating means having passages therein for admitting projecting contacts of a plug-in unit for contact with an engageable broad face of certain bus bars at each opening, said certain bus bars being separated from each other by others of said series of bus bars, said insulating means having obstructing portions preventing access to said others of said series of bus bars and to the broad faces of said certain bus bars respectively opposite the engageable broad faces thereof, said others of said series of bus bars being insulation-covered at least at each opening in the wall of the duct.

13. In combination, a unit length of bus duct and a plug-in unit, said bus duct including an enclosing rectangular metal duct, a series of relatively broad and thin bus bars having their broad faces in successive parallel planes, said enclosing rectangular metal duct having a wall which extends across the edges of said bus bars, said wall having openings for admitting plug-in contacts of a plug-in unit, said plug-in unit having a series of projecting contacts and means therein resiliently biasing said contacts in the same direction laterally into contact with the broad faces of respective ones of said bus bars, there being only one contact for any one bus bar and coacting means in said bus duct and on said plug-in unit for restraining said plug-in unit against lateral shift thereof relative to said duct as a reaction to said lateral resilient biasing of said contacts.

14. The combination in accordance with claim 13 wherein said series of bus bars includes companion pairs of bus bars, the pairs being separated relatively far apart and the bars of each pair being closely adjacent each other, one bus bar of each pair being engaged by a respective one of said plug-in contactss at the broad face thereof opposite the companion closely adjacent bus bar, each of said bus bars engaged by a plug-in contact being insulated from the companion bus bar and connected at the ends thereof to the companion bus bar of another of said bus bars engaged by a plug-in contact.

15. In combination, a unit length of bus duct and a plug-in unit therefor, said bus duct including an enclosing rectangular metal duct, a series of relatively broad and thin bus bars having their broad faces in successive parallel planes, at least one wall of said enclosing rectangular metal duct extending across the edges of the bus bars and having openings therein providing access to said bus bars, insulating supporting means at each opening having passages therein for admitting projecting contacts of a plug-in unit for engagement, respectively, with a broad face of at least certain of the bus bars at each opening, and said plug-in unit having projecting contacts provided with laterally resiliently biasing means, there being only one contact for any one bus bar, and cooperating means forming parts of said insulating supporting means and of said plug-in unit for providing reaction force at each of said openings for resisting lateral shift of the plug-in unit relative to the bus duct as a reaction to the lateral resilient biasing of said contacts.

16. The combination in accordance with claim 15 wherein said cooperating means include camming means slanting relative to the planes of said bus bars for causing lateral deflection of said resiliently biased contacts and consequent build-up of resilient bias of the contacts during application of the plug-in unit to the bus duct.

17. The combination of a unit length of bus duct and a plug-in unit, said unit length of bus duct including an enclosing rectangular metal duct, a series of relatively broad and thin bus bars having their broad faces in successive parallel planes, at least one of the walls of the enclosing rectangular metal duct extending across the edges of said bus bars and having openings intermediate the ends thereof and extending across said series of bus bars for admitting plug-in contacts of a plug-in unit, the series of bus bars opposite each of said openings including certain bus bars each having only one broad face thereof exposed and the opposite broad face thereof covered by insulation, the remaining bus bars of the series of bus bars being insulation-covered at least at said openings, a plug-in unit having contacts projecting through said openings and resiliently pressing laterally against said exposed broad faces, respectively, of said certain bus bars, and coacting means forming parts of said unit length of bus duct and of said plug-in unit providing reaction therebetween against the force of the resilient pressure of said contacts against said bus bars as aforesaid.

18. A plug-in device for bus duct including a body portion, a series of fixed conductors, a like number of elongated projecting contacts keyed to said fixed conductors, each of said projecting contacts having a portion in rocking-contact engagement with a respective one of said fixed conductors and having a plug-in contact portion spaced longitudinally from said rocking-contact portion, each of said projecting contacts having lateral spring bias means effective at a point between the plug-in contact portion and the rocking-contact portion thereof, and each of said projecting contacts having a stop limiting the lateral travel thereof under spring bias, the plug-in contact portion of each of said projecting contacts projecting well beyond said body portion and beyond the related stop to a position of clearance.

19. A unit-length of plug-in bus duct including an enclosing rectangular metal duct, a series of relatively broad and thin bus bars having their broad faces in successive parallel planes parallel to an opposed pair of walls of said rectangular metal duct, at least one of the remaining walls of the enclosing rectangular metal duct extending across the edges of said bus bars and having access openings at points distributed between the ends of the duct suitably proportioned for admitting projecting plug-in contacts of a plug-in unit, the series of bus bars opposite each of said openings being arranged in closely spaced pairs of bus bars providing a low-impedance characteristic, each pair of bus bars being spaced relatively far from the adjacent pair or pairs of bars, one bar of each pair of bus bars being completely covered by insulation in the region adjacent each opening in the enclosing duct and the companion bus bar of each pair having insulation-covering across the broad face thereof confronting said one insulation-covered bus bar of its pair, the broad face of said companion bus bar remote from said one insulation-covered bus bar being at least in part bare and exposed for engagement by a projecting contact of a plug-in unit, said completely covered bus bars and said companion bus bars occurring alternately in said series of bus bars.

References Cited in the file of this patent

UNITED STATES PATENTS

| | | |
|---|---|---|
| 1,625,485 | Maurer | Apr. 19, 1927 |
| 2,043,796 | Frank | June 9, 1936 |
| 2,111,118 | Lake | Mar. 15, 1938 |
| 2,251,403 | Frank et al. | Aug. 5, 1941 |
| 2,262,067 | Togesen et al. | Nov. 11, 1941 |
| 2,264,075 | Frank | Nov. 25, 1941 |
| 2,287,502 | Togesen et al. | June 23, 1942 |
| 2,292,320 | Hammerly | Aug. 4, 1942 |
| 2,318,860 | Huguelet | May 11, 1943 |
| 2,365,514 | Bosch | Dec. 19, 1944 |
| 2,411,128 | Carlson | Nov. 12, 1946 |
| 2,439,956 | Wagner et al. | Apr. 20, 1948 |
| 2,479,234 | Hammerly et al. | Aug. 16, 1949 |
| 2,482,310 | Adam | Sept. 20, 1949 |
| 2,653,991 | Dyer et al. | Sept. 29, 1953 |
| 2,704,838 | Macha et al. | Mar. 22, 1955 |
| 2,720,632 | Stieglitz | Oct. 11, 1955 |
| 2,725,541 | Born et al. | Nov. 29, 1955 |
| 2,786,908 | Constantine et al. | Mar. 26, 1957 |
| 2,883,637 | Born | Apr. 21, 1959 |
| 2,903,503 | Carlson et al. | Sept. 8, 1959 |

FOREIGN PATENTS

| | | |
|---|---|---|
| 21,701 | Holland | May 15, 1930 |

OTHER REFERENCES

Catalog 6010 Roller-Smith Corporation, pages 101, 103, and 108 Jan. 3, 1955. (Copy in Interference No. 91–709.)

AIEE of January 1955, pages 438 to 443. (Copy in Interference No. 91–709.)